United States Patent [19]

Pavek

[11] Patent Number: 5,466,170
[45] Date of Patent: Nov. 14, 1995

[54] END-INSERTION DATA TERMINAL DOCK WITH POSITIVE DATA TERMINAL LOCK AND BOUNCE-PREVENTING CONTACT ENGAGEMENT BIAS

[75] Inventor: John G. Pavek, Cedar Rapids, Iowa

[73] Assignee: Norand Corporation, Cedar Rapids, Iowa

[21] Appl. No.: 146,882

[22] Filed: Nov. 2, 1993

[51] Int. Cl.⁶ .................................................. H01R 13/64
[52] U.S. Cl. ............................. 439/374; 439/31; 439/534
[58] Field of Search .................................. 439/429, 357, 439/358, 374, 377, 297, 298, 534, 31; 320/2

[56] References Cited

U.S. PATENT DOCUMENTS

| | | |
|---|---|---|
| 3,143,697 | 8/1964 | Springer . |
| 3,348,116 | 10/1967 | Freeman et al. . |
| 3,390,319 | 6/1968 | Robison . |
| 3,895,768 | 7/1975 | Scheck . |
| 4,588,938 | 5/1986 | Liautaud et al. . |
| 4,723,281 | 2/1988 | Peiker et al. . |
| 4,773,032 | 9/1988 | Uehara et al. . |
| 4,845,738 | 7/1989 | Takano . |
| 4,857,716 | 8/1989 | Gombrich et al. . |
| 4,916,441 | 4/1990 | Gombrich . |
| 5,052,943 | 10/1991 | Davis . |
| 5,186,558 | 2/1993 | Sherman et al. . |
| 5,195,183 | 3/1993 | Miller et al. . |
| 5,203,021 | 4/1993 | Repplinger et al. ................ 439/297 X |
| 5,310,358 | 5/1994 | Johnson et al. ......................... 439/358 |

OTHER PUBLICATIONS

Advertising Brochure, "4000 Series Communications Network", Norand Data Systems, Cedar Rapids, Iowa, 1989.
Advertising Material, "80–Column and 40–Column Van Mount Printers", Norand Data Systems, Cedar Rapids, Iowa.
Advertising Material, "80–Column Modular Printer", Norand Data Systems, Cedar Rapids, Iowa, 1988.

Primary Examiner—Larry J. Schwartz
Assistant Examiner—Jill DeMello
Attorney, Agent, or Firm—Simmons, Perrine, Albright & Ellwood

[57] ABSTRACT

A docking device for a data collection terminal comprises a latch which positively retains an inserted data collection terminal in a docking position in which communication contacts are communicatively coupled to complementary contacts on the docking device. The latch urges an inserted data collection terminal into a latched rest position with an optimal minimum contact engagement force, such that any shock or vibration has a tendency to increase the contact engagement force to thereby eliminate an inadvertent opening of contacts due to shock or vibration.

13 Claims, 5 Drawing Sheets

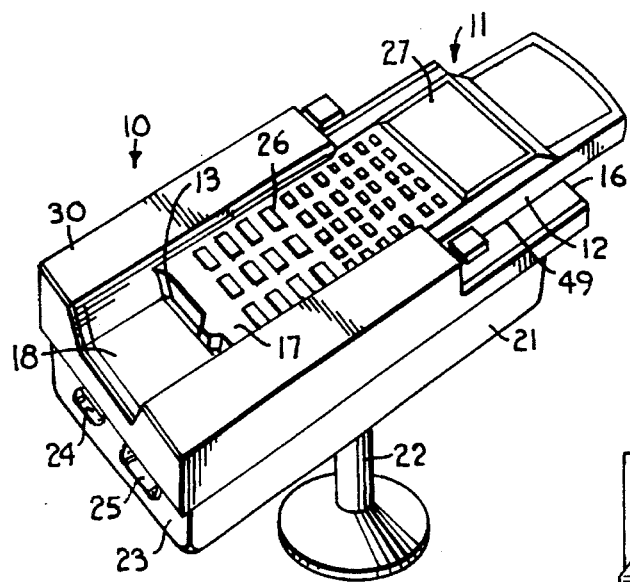
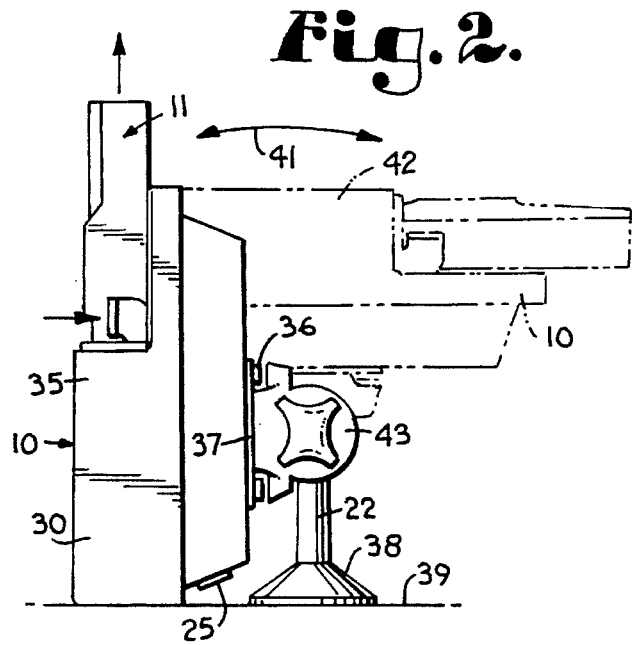
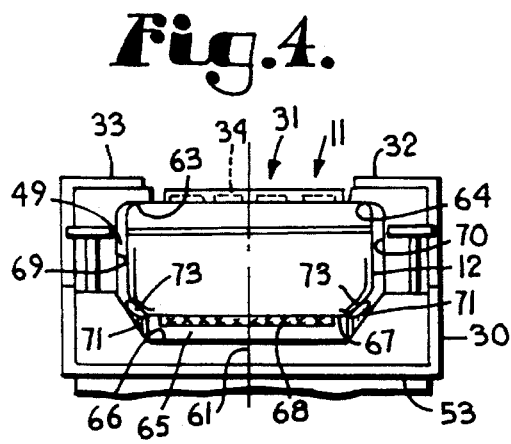
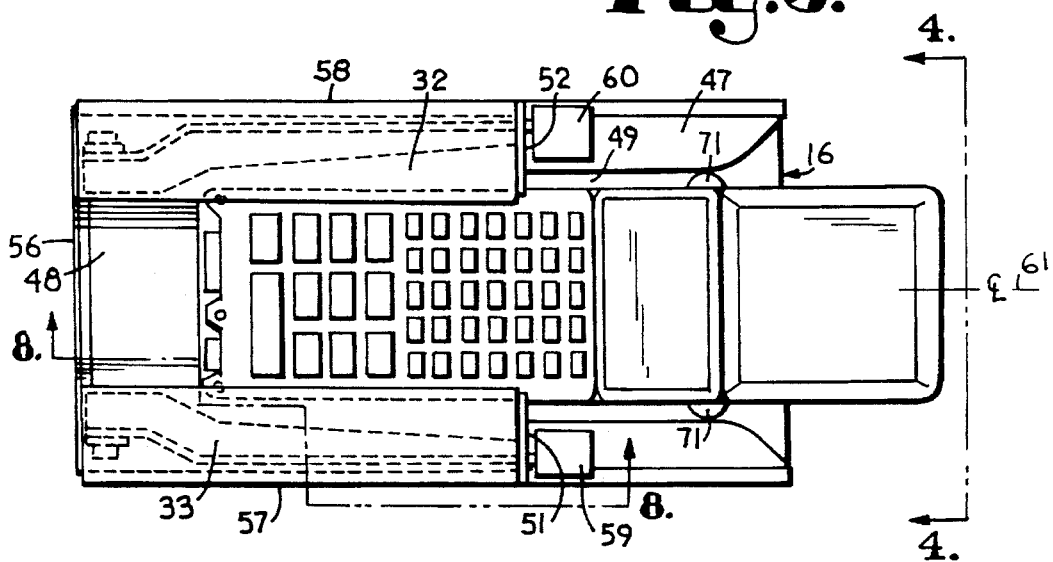

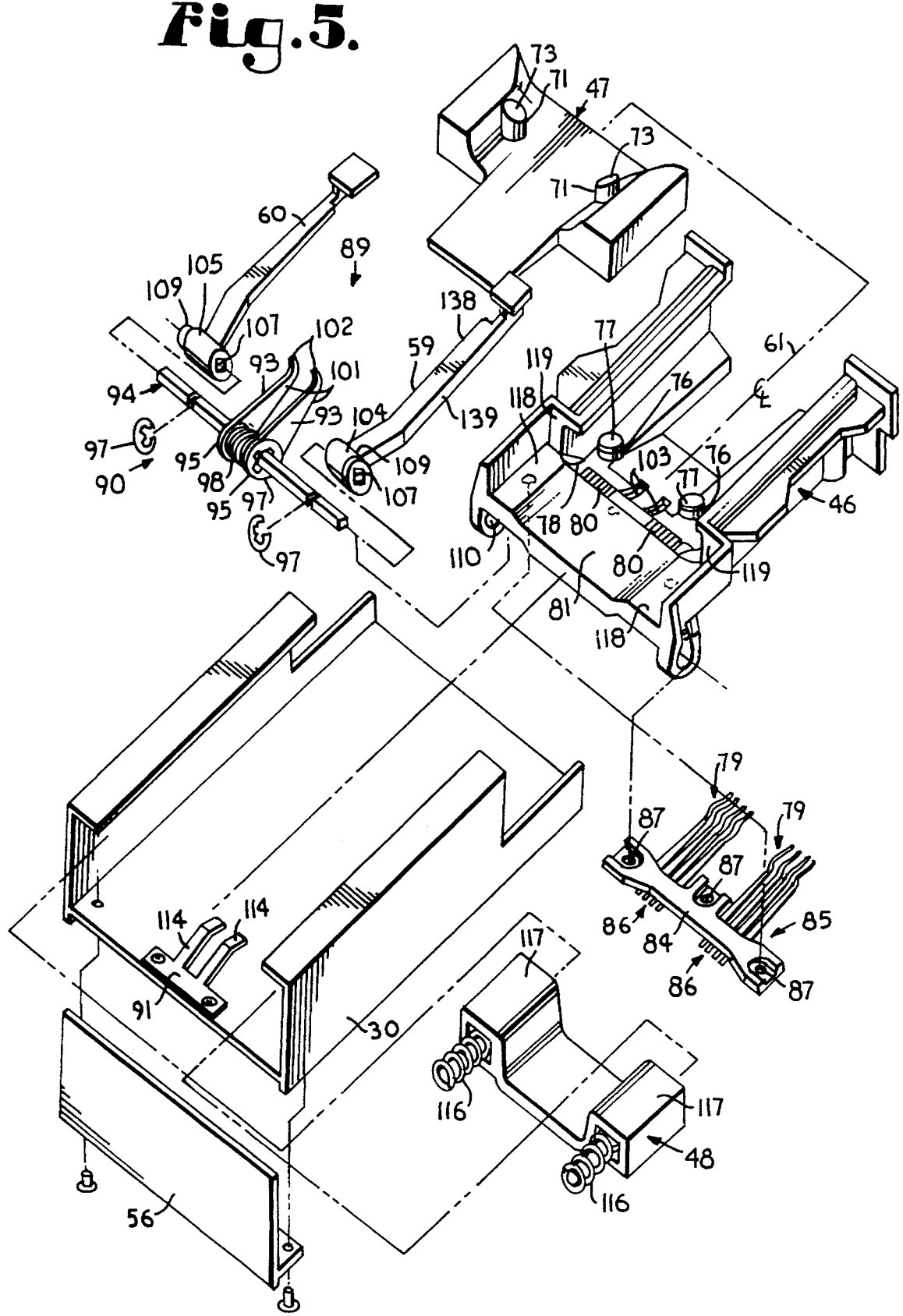

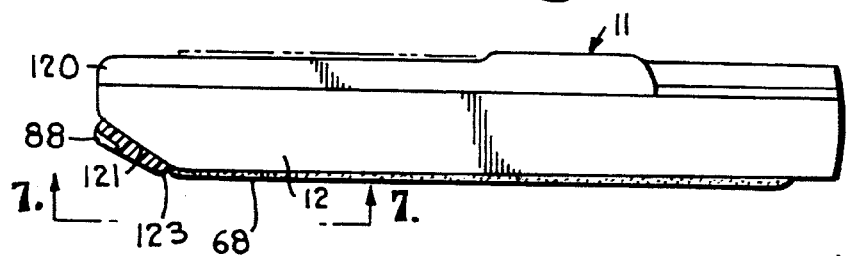
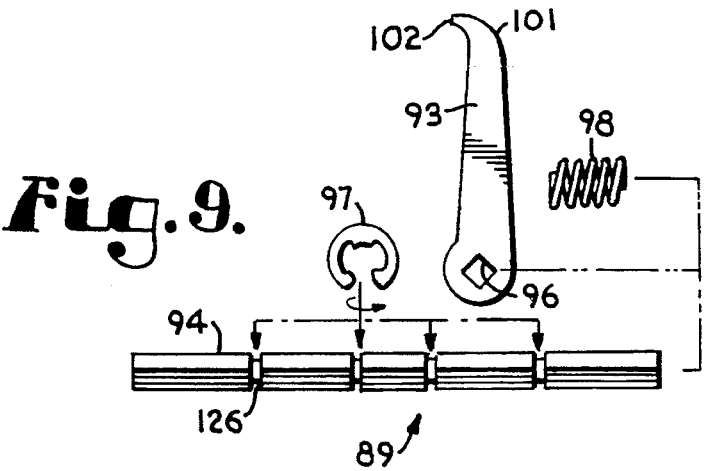
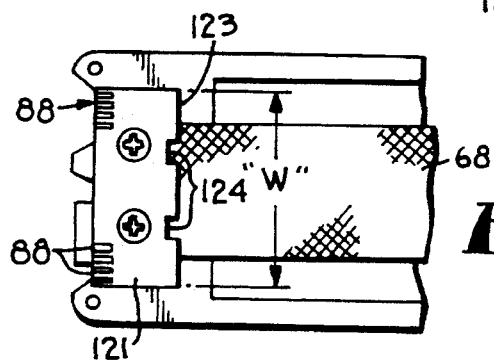
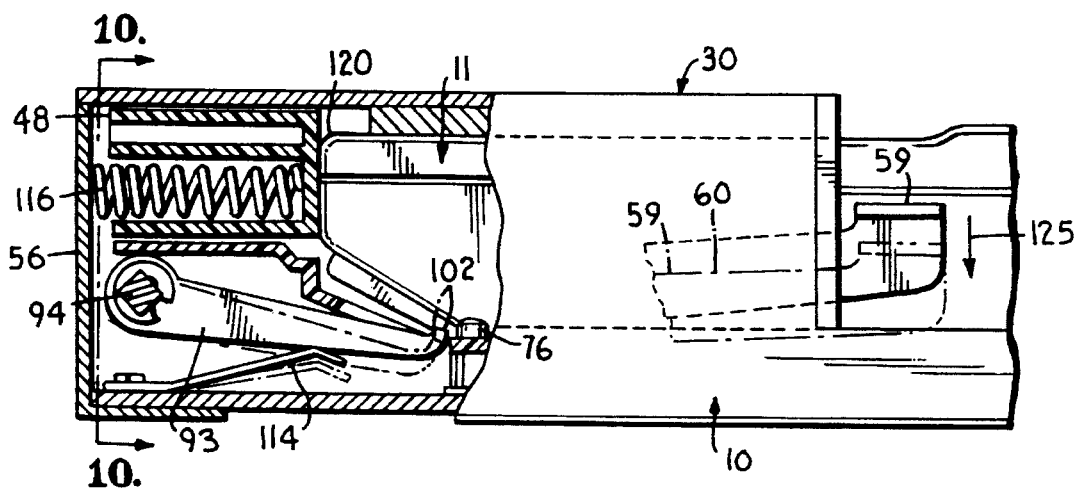

Fig.10.
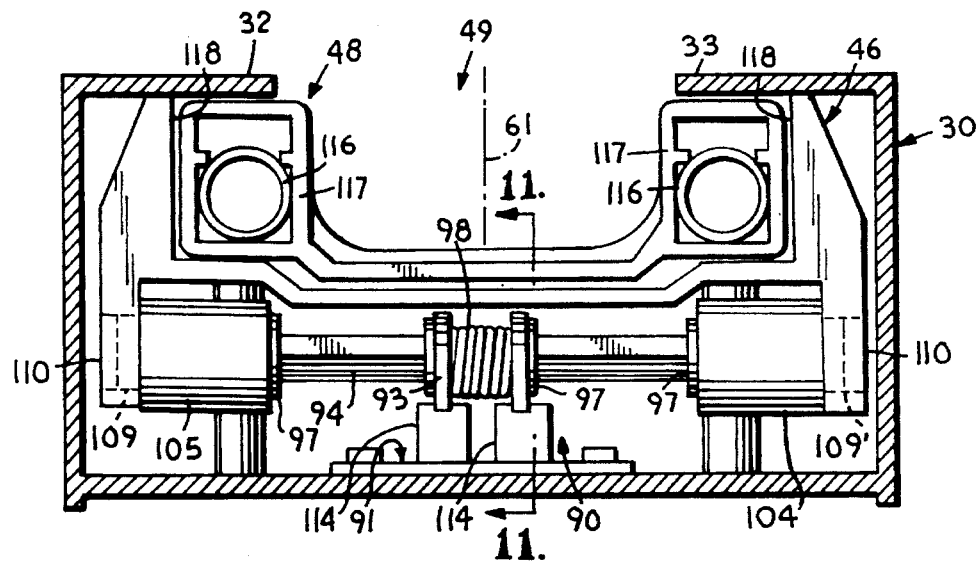
Fig.11.
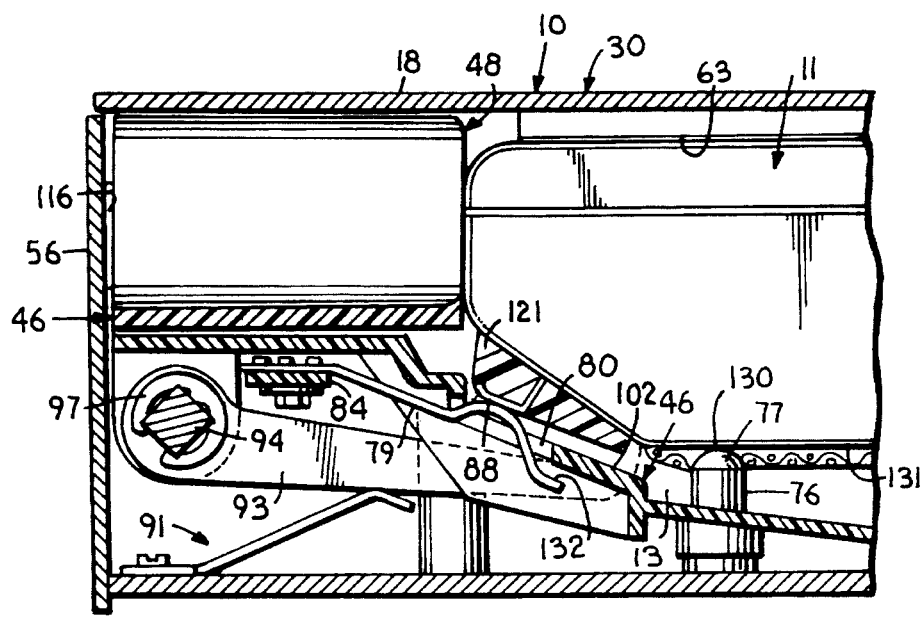
Fig.12.

END-INSERTION DATA TERMINAL DOCK WITH POSITIVE DATA TERMINAL LOCK AND BOUNCE-PREVENTING CONTACT ENGAGEMENT BIAS

BACKGROUND OF THE INVENTION

This invention relates generally to data processing systems, and more particularly to docking apparatus which removably receives and retains a portable data collection terminal and which generally includes communications and power terminals which become coupled to such a portable data collection terminal upon insertion of a portable data collection terminal into the docking apparatus.

The invention relates also to apparatus for and methods of retaining a data terminal within the docking apparatus and to apparatus for and methods of establishing and maintaining communicative contact with respective communications and power terminals within the docking apparatus.

Hand-held, portable data collection terminals are well known as practical workstations which operators may readily port to various work sites and collect business transaction or inventory data at such work site. The data collection terminals are therefore essential elements of many business systems, updating central processing units of these systems. Communication between the portable data collection terminals and the central data processing unit may be provided on a continuous basis via RF data transceivers, or by other equivalent wireless communications links. In many applications, batch data transfer from the data collection terminals to the respective information systems may be more practical and may be preferred.

Portable data collection terminals are typically powered by self-contained power sources, rechargeable batteries, for example. The sizes or capacities of batteries are desirably chosen to permit each respective, portable data collection terminal to operate throughout an entire workday. At the end of an operational cycle, or at the end of a period of use, a data collection terminal may be inserted into a docking device, generally known as terminal dock. When a data collection terminal is inserted into a terminal dock, or simply dock, the power source of the inserted data collection terminal becomes coupled to a battery recharging circuit. Recharging periods may be used efficiently to transfer collected data from the data collection terminal to a central data processing unit of a respective business system, and to update the data collection terminal with data and instructions as may be needed during a subsequent use period.

The ability to pre-load a set of instructions into a data collection terminal before each use offers an opportunity to make the data collection terminals more task-specific, and hence, more user friendly. For example, a set of merchandise identification numbers and related instruction information may be transferred to the data collection terminal during a recharging period. During a subsequent use period an operator may be instructed by such transferred instructions to collect inventory data on the respective items of merchandise based on the specific merchandise identification numbers or codes which had been pre-loaded and which may appear in sequence as the desired inventory information is being collected. After inventory quantities on all preloaded items have been collected, the data collection terminal may inform the operator that the task is completed, and to return the data collection terminal to a docking device for a data transfer of the collected inventory information to the central processing unit.

The transfer of specific batches of information via a dock may also advantageously apply to other operations, such as to route delivery operations, for example, where a user of the data collection terminal may be out of radio contact with a fixed RF receiving station of a central data processing system. In general, a docking device is generally regarded to be a most desirable, if not necessary, complement for a portable data collection terminal.

Usefulness of data collection terminals is enhanced with an increased accessibility to the docking devices and with more facilitating docking devices with positive data collection terminal locking devices which still provide for ready, one-handed and effortless removal of the data collection terminals from the docking devices.

Much engineering effort has already been directed to improving existing terminal docks. However, an inherent conflict seems to exist between a desire to reduce the amount of effort needed to insert or remove a data collection terminal into or from a dock, and a need to assure establishing proper terminal connections between electrical and communications terminals of an inserted data collection terminal and corresponding terminals of the dock. For example, it has been found that a single defective connection in a charge monitoring circuit may not only destroy a battery of the data collection terminal, but may actually destroy the data collection terminal itself. Also, intermittent breaks in data connections between a docked data collection terminal and its respective dock may cause errors to be transferred to a central processing unit, or may cause erroneous work requests to be transferred to the data collection terminal. Particularly in route operations, where such erroneous information may not be discovered until a driver has driven many miles, any data loss to or from a data collection terminal due to contact bounce or bad communications connections is clearly unacceptable.

SUMMARY OF THE INVENTION

It is therefore an object of the invention to provide an improved terminal dock which facilitates a ready insertion or removal of a data collection terminal into or from the terminal dock, and which provides electrical and signal contact connections with a minimized tendency to separate under severe shock or vibratory conditions.

It is another object of the invention to provide a terminal dock which may temporarily hold a data collection terminal without communicative or electrical connections and from which a data collection terminal may be removed without being unlocked from a positive retention position in the terminal dock.

It is yet a further object of the invention to retain a data collection terminal within a receiving cradle of a terminal dock with a positive retaining lock, and to provide a terminal release mechanism which, upon activation, moves the data collection terminal out of electrical and communicative engagement with the terminals of the terminal dock to prevent inadvertent selective engagement of such contacts.

According to the invention, an end-insertion docking device for a portable data collection terminal comprises a docking channel which has an insertion opening at an insertion end thereof. The docking channel has a base surface along the length thereof and retention caps longitudinally of the docking device bounding a terminal access opening opposite the base surface of the docking channel. A plurality of spring contacts are disposed at a docking seat at a retention end opposite the insertion end. The spring contacts are yieldably disposed in the insertion path of an inserted data collection terminal. Upon insertion of a data collection terminal longitudinally of the insertion path toward the docking seat, the spring contacts yieldably engage complementary surface contacts on the data collection terminal. A retention pawl mechanism includes at least one retention prong which is biased with a bias force toward an inserted data collection terminal to engage and positively latch such an inserted data collection terminal in a retention position against the docking seat and in a direction away from engagement with the spring contacts.

A positive locking or latching feature which biases a retained, inserted data collection terminal into a defined position away from spring contacts of the docking device, hence into a position at which spring contact forces are relatively low, may appear on first glance undesirable. However, it may be realized from the detailed description of the invention that any vibrational movement of the data collection terminal, such as may be caused by shock or vibration in an industrial environment, for example when the docking device is mounted on board of a vehicle, is found to increase the contact force. Thus, a chance of an undesirable contact bounce, or even a temporary decoupling of complementary contact surfaces, is substantially minimized if not avoided, even under severe vibratory conditions.

According to one particular aspect of the end-insertion docking device in accordance with the invention, the retention pawl mechanism may comprise at least one retention pawl supporting the retention prong at one end thereof. The retention prong would be oriented to engage and retain an inserted data collection terminal. The other end of the pawl may be mounted in accordance herewith to a co-pivotal pivot shaft. A release is also co-pivotally mounted to the pivot shaft and extends from the pivot shaft over a length which exceeds the length of the pawl to move the retention prong out of a retention position with a lesser force than a bias force against an inserted data collection terminal.

According to another particular aspect which may be found in an end-insertion docking device pursuant to the invention, the docking seat includes a seat base which is movably mounted to move longitudinally of the docking channel in a direction toward and away from the insertion end. The seat base is spring biased toward the insertion end and into the insertion path of a data collection terminal being inserted into the insertion end of the docking channel. A data collection terminal upon being inserted into the docking channel would be inserted with an insertion force which overcomes the spring bias to which the seat base is subjected to move the seat base in a direction away from the insertion end until the pawl engages the data collection terminal and retains the data collection terminal in the terminal docking device.

Insertion friction between the data collection terminal and the end-insertion docking device may be minimized by the guides being in the shape of spherical and cylindrical surfaces having point or line contact with edges of a data collection terminal being inserted into the docking channel. The guides, in accordance with the invention, would be disposed adjacent the base surface of the docking channel to bias a data collection terminal in contact therewith toward the retaining caps of the docking channel.

Other features and advantages of the invention will become apparent from reading the detailed description below.

BRIEF DESCRIPTION OF THE DRAWINGS

The detailed description of the invention may be read in reference to the appended drawing wherein:

FIG. 1 is a perspective view of an end-insertion type docking device showing features of the invention, and showing a data collection terminal inserted into the docking device;

FIG. 2 is a side view of the docking device of FIG. 1, showing a preferred swivel or pivot mounting arrangement for the docking device;

FIG. 3 is a top view of the docking device shown in FIG. 1;

FIG. 4 is an end view of the docking device in accordance with the invention, showing the insertion end of the docking device, the view taken in the direction "4—4" in FIG. 3;

FIG. 5 is an exploded view of a cradle portion of the docking device shown in FIG. 1;

FIG. 6 is a simplified and partially sectioned side elevation of a data collection terminal of a type which may complementarily be inserted into and retained by the docking device of FIG. 1;

FIG. 7 is a partial bottom view of the data collection terminal shown in FIG. 6 taken in the direction "7—7";

FIG. 8 is a partially sectioned partial side view of the docking device taken in the direction of "8—8" in FIG. 3;

FIG. 9 shows an assemblage of elements of a pivot shaft assembly in accordance with features of the invention;

FIG. 10 is a section through the docking device at a retention end thereof and taken in the direction "10—10" indicated in FIG. 8;

FIG. 11 is a partial view of a section shown in FIG. 10, taken in the direction "11—11" the partial view showing primarily a pivot shaft of the respective section;

FIG. 12 is an enlarged and somewhat irregularly broken sectional view through the retention end of the docking device in accordance herewith, the sectional view showing a portion of a data collection terminal retained within the docking device and one of the contacts engaging the data collection terminal when held in such retained position;

DETAILED DESCRIPTION OF THE INVENTION

Figure 13:
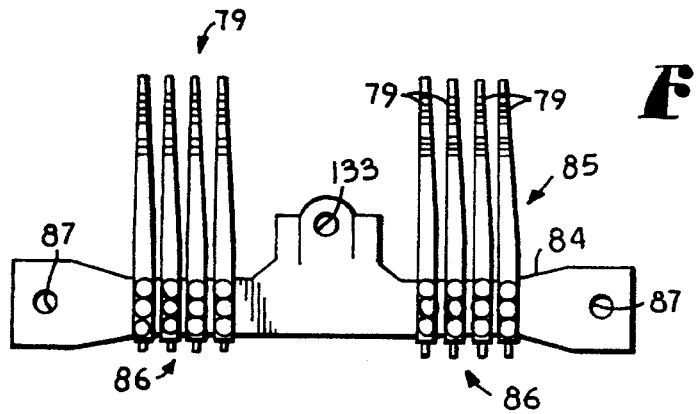
FIG. 13 is a somewhat enlarged partial view of a spring contact assembly of the docking device in accordance with the invention.

FIG. 1 is an overall pictorial representation of a docking device 10 which represents an embodiment of the present invention. FIG. 1 also shows a data collection terminal 11 in a fully inserted position within the docking device 10. In such fully inserted position, the data collection terminal 11 would be positively retained by the docking device 10. The fully inserted position is hence also referred to as a locked position of the data collection terminal 11. A housing 12 of the data collection terminal 11 is generally of elongate and rectangular shape. The elongate shape of the data collection terminal 11 not only makes it easier for a person to hold the terminal 11 with one hand, but also provides lateral restraint when the data collection terminal 11 is inserted into the docking device 10.

A terminal receiving cavity or retention cavity 13 of the docking device 10 extends generally in a longitudinal direction through the docking device 10. A cross section through the terminal receiving cavity 13 is somewhat larger in area than a cross-sectional shape of the data collection terminal 11, and is, therefore, of ample size for receiving a data collection terminal 11 without undue restraint. When the docking device 10 is vacant to receive a data collection terminal 11, such a terminal 11 would be inserted from an insertion end 16 into the receiving cavity 13 of the docking device 10, with a lower contact end 17 of the data collection terminal 11 becoming disposed adjacent a retention end 18 opposite the insertion end 16 of the docking device 10.

FIG. 1 shows the docking device 10 mounted onto a communications unit or communications base 21, which, in turn is supported by a typical swivel or pivot mount 22. The communications base 21 internally includes communication cable splitters and may provide, for example, a mounting surface 23 for communications and power plugs, such as connectors 24 and 25. As with other known docking devices, it is desirable that the inserted data collection terminal 11 remain operational while being retained in the docking device 10. Thus, a keyboard 26 and a display screen 27 of the data collection terminal 11 desirably remain accessible while the data collection terminal 11 is retained in the docking device 10. An outer housing shell 30 of the docking device 10 is, therefore, preferably in a cross-sectional shape of a "C" (see the end view of FIG. 4). The outer housing shell 30 is the outer skeleton of the docking device 10 and imparts external ruggedness by preferably being of an extruded aluminum channel. Referring to FIG. 4, an open gap 31 between lateral caps 32 and 33 of the channel structure of the outer housing 30 provides for top access to keys 34 of the keyboard 26.

FIG. 2 shows a side view of the docking device 10. The channel member of the outer housing shell 30 is more clearly shown as a modified channel in that, of the extruded channel shape, sides 35 including the caps 32 and 33 have been partially cut back or removed adjacent the insertion end 16 of the docking device 10. Thus, the insertion end 16 has the appearance of a stepped end. The outer housing shell 30 is attached to the communications base 21. The communications base 21, in turn, is attached by typical threaded fasteners 36 to a mounting base 37 of the commercially available swivel or pivot mount 22. With a pedestal 38 being firmly attached to a mounting surface 39, the docking device 10 may be pivoted through a substantial arc as indicated by an arrow 41, to adjust the docking device 10 into any number of convenient orientations, an alternate horizontal orientation 42 of the docking device 10 being shown in dashed lines in FIG. 2. The swivel or pivot mount 22 may be rigidly locked in any of these adjusted positions by a typical hand knob 43. The use of the swivel or pivot mount 22 is looked upon as particularly advantageous for mounting the docking device 10 on board of service vehicles, for example, fork lift trucks, and the like.

FIG. 3 is a top or plan view of the docking device 10, the plan view showing, at least partly, several major structural elements of the docking device 10, to characterize the docking device as an assembled structure or a docking device assembly 10. It has been determined that the docking device 10 is best suited for its purpose by an exceptional ruggedness to withstand hazards and harsh treatment in industrial environments such as factories and warehouses, or on route delivery trucks. The docking device 10 is also required to offer protection for a retained data collection terminal 11, and to exhibit desirably a mere minimum of insertion or retraction friction toward the data collection terminal 11. The outer housing shell 30, as an extruded aluminum channel has been found to provide a fair degree of protection and ruggedness. Inserted into the outer housing shell 30 are a docking seat molding 46, an insertion guide molding 47 and a seat base molding 48 as major internal structural elements which may be molded of a high impact plastic. The insertion guide molding 47 is disposed at the insertion end 16 of the outer housing 30. The docking seat molding 46 is disposed adjacent the insertion guide molding 47. The insertion guide molding 47 and the adjacent docking seat molding 46 form, by their mutual longitudinally adjoining arrangement, an insertion or docking channel 49 for the data collection terminal 11, which merges into and terminates at its lower end in the receiving cavity 13. The molded plastic elements of the docking seat molding 46, the insertion guide molding 47 and the seat base molding 48 are further protected, aligned to and held in their respective positions by the outer aluminum channel of the outer housing 30.

A preferred assembly sequence, not referring to other necessary subassemblies, such as electrical contacts and connection, would generally proceed by an initial insertion of the docking seat molding 46 from the insertion end 16 into the channel of the outer housing 30. The docking seat molding 46 features right and left flanges 51 and 52 which establish the fully inserted position of the docking seat molding 46 within the outer housing shell 30. The docking seat molding 46 may then be fastened in that position to a base wall 53 of the extruded aluminum channel of the outer housing shell 30. The insertion guide molding 47 may thereafter be slid into position at the insertion end of the docking device 10 and also fastened in a typical manner to the base wall 53 Of the outer housing shell 30. The seat base molding 48 may thereafter be slid into the outer housing shell 30 and into engagement with the docking seat molding 46 from the retention end 18 of the docking device 10, and would be held in position, as will become more apparent from the further description hereof, by a docking seat base plate 56.

The top view of the docking device 10 also depicts the presence, along right and left sides 57 and 58 of the docking device 10, right and left latch release levers 59 and 60, respectively. As becomes apparent, the docking device ! 0 is generally symmetric about a central plane through a centerline 61. The right and left latch release levers 59 and 60 are in the shape of mirror images of each other and are preferably positioned such that one or the other is accessible by either a left-handed or by a right-handed person with equal ease. As is further seen from the plan view, the fully inserted data collection terminal 11 is retained by overlapping inner edges of the caps 32 and 33 of the outer housing shell 30.

In reference to FIG. 4, these extruded caps 32 and 33 constitute a substantially rigid and strong backing and support for underlying molded plastic retaining ledges 63 and 64 of the docking seat molding 46, the retaining ledges 63 and 64 forming upper, overhanging retention caps having inwardly facing surfaces which will be in contact with the data collection terminal 11 when the data collection terminal 11 is retained within the docking channel 49. The retention surface caps or retention caps 63 and 64 are spaced so as not to impede access to the keyboard 34 of the data collection terminal 11 while the terminal 11 is seated in the docking device 10.

FIG. 4, showing an end view of the docking device 10 taken from the insertion end 16 in FIG. 3, shows further a particularly advantageous structural feature of the docking device 10 and particularly of the docking seat molding 46 and the insertion guide molding 47. A clearly defined space 65 is shown to exist between an inner base wall or surface 66 of the docking channel 49, the docking device 10 and an adjacent lower surface 67 of the portable data collection terminal 11, as inserted into the docking device 10. In particular, the inserted data collection terminal 11 shows a handstrap 68, which may preferably form part of the data collection terminal as a user enhancement and terminal 11 protection device. A user may insert a hand between the data collection terminal 11 and the handstrap 68 to safely retain the data collection terminal 11, even if the user's handgrip on the data collection terminal 11 is temporarily relaxed. The material of the handstrap 68 may be an elastic woven, relatively soft material. The presence of such a strap 68 may impede a ready insertion or removal of a data collection terminal 11 from the docking device 10. Thus, as shown in FIG. 4, a height of upright walls 69 and 70 of the docking seat molding 46 fixedly establish a spacing between the retention caps 63 and 64 and the base wall 66 of the docking channel 49. Two or a pair of upper guide pins 71 are laterally spaced transversely with respect to the longitudinal axis or centerline 61 through the docking channel 49. The pair of upper guide pins 71 is mounted from below through the insertion guide molding 47 to extend from the inner base wall 66 toward the upper or open side of the outer housing shell 30, i.e., toward the gap 31 of the extruded channel. The upper guide pins 71 are preferably spaced to engage rounded longitudinal edges of the housing 12 of the inserted data collection terminal 11. Extending guide ends 73 of the upper guide pins 71 are sloped inwardly toward the central plane or centerline 61 through the docking channel 49 of the docking device 10. The extending ends 73 are also convexly cylindrically rounded with respect to a cylindrical axis which hypothetically extends in a plane transverse to the centerline 61 and parallel to the direction of the slope of the guide surfaces 73 toward the center of the docking channel 49, to crown the inwardly sloping guide surfaces or ends 73, such that contact between the pins 71 and the housing 12 of the data collection terminal 11 becomes at most a line contact, if not a point contact, since rounded edges of the housing 12 are rounded substantially perpendicularly to the rounded or crowned sloped surface end 73 of the upper guide pins. The sloped ends funnel the data collection terminal 11 toward the centerline 61 of the docking device 10.

Referring now to FIG. 5, there is shown an exploded view of the docking device 10, showing the already described elements as well as other details. The docking seat molding 46 shows, laterally opposed near its center, a pair of lower guide pins 76. The lower guide pins 76 are preferably disposed slightly closer to the central axis or centerline 61 through the docking device 10 and the centered data collection terminal 11. Thus, extending guide ends 77 of the pins 76 are spherically crowned. The lower guide pins 76 are, hence, not sloped toward the center as are the upper guide pins 71. The spherically crowned ends 77 permit a smooth engagement along or just inside of rounded lateral lower corners of the housing 12 of the data collection terminal 11. Laterally or transversely spaced edge guide surfaces 78 are disposed at the end of the docking channel 49 on both sides of the docking seat molding 46. The edge guide surfaces 78 constitute part of the internal shape of the docking channel 49 and are part of the cavity 13 adjacent the retention end 18. When the data collection terminal 11 becomes substantially seated within the docking device 10, the lateral edge guide surfaces 78 take on a final guiding function to position the data collection terminal 11 with respect to spring contacts 79. The spring contacts 79 protrude through respective contact slots 80 at a docking seat 81 formed by the docking seat molding 46 into the docking channel 49. The guide pins 71 and 76 perform a guiding function in lieu of guiding surfaces. The guide pins 71 and 76 advantageously minimize surface contact between the data collection terminal 11 and the docking device 10. The guide pins 71 and 76, preferably of a low-friction plastic material, advantageously minimize sliding friction forces during the insertion or extraction of the data collection terminal 11 into or from the docking device 10. Minimal insertion forces are a distinct characteristic of the instant docking device, in that the relatively low insertion and extraction friction forces allow an operator or user of the data collection terminal 11 to insert the data collection terminal 11 into, or to remove the data collection terminal 11 from, the docking device 10, using but one hand. One-handed insertion or removal of data collection terminals has been attempted prior to the present invention. However, sliding friction between the data collection terminals and a corresponding docking device has heretofore required an increased effort on the part of an operator. A minimal terminal insertion and extraction friction facilitates docking or removing the data collection terminal 11. Effortless, one-handed insertion or removal of the data collection terminal 11 into or out of the docking device 10 tends to reduce a risk of an operator dropping the data collection terminal 11. In fact, such effortless insertion or removal may permit an operator to direct an increased amount of attention to concurrent operations. The guiding function of the protruding guiding surfaces or ends 73 and 77 of the respective pins 71 and 76 has been found to be smooth but precise, readily centering the data collection terminal 11 within the insertion cavity 13. On full insertion of the data collection terminal 11 into the insertion cavity 13 of the docking device 10, and upon latching of the data collection terminal 11 in such fully inserted position, the housing 12 of the data collection terminal 11 may actually be lifted slightly from the guiding crowned surfaces 77 of the pins 76.

The spring contacts 79 are mounted on a contact support bracket 84 of a spring contact assembly 85, with electrical conductor leads 86 leading to the communications base 21. The electrical conductor leads 86 may be part of a flat flexible printed circuit cable assembly, or they may consist of individual electrical leads or of bonded ribbon conductors, generally referred to as a cable assembly 86. The support bracket 84 shows preferred mounting holes 87 for mounting the bracket 84 to the underside of the docking seat molding 46 prior to its assembly as described. When the spring contact assembly 85 is mounted to the underside of the docking seat molding 46, the contact springs 79 extend through the slots 80 into the path of the data collection terminal 11, such that an inserted data collection terminal 11 will engage and deflect the spring contacts 79 toward the slots 80, thereby resiliently tensioning the spring contacts 79 to exert a contact force against complementary surface contacts 88 (see FIG. 7). The described structure minimizes, if not entirely eliminates, any tendency of bounce or inadvertent electrical decoupling of the spring contacts 79 from the complementary surface contacts 88 while the data collection terminal 11 is latched into the retention position within the receiving cavity 13 of the docking device 10.

Another subassembly mounted to the docking seat molding 46 prior to its assembly into the outer housing shell 30 is a retention pawl assembly 89 of a retention pawl mechanism 90 which further includes a preferred leaf spring structure 91 which is preferably attached, such as by threaded screws or by riveting or the like, to the retention end 18 of the outer housing shell 30. In an exemplary embodiment, the retention pawl assembly 89 includes at least one retention pawl lever, but preferably two retention pawl levers 93 which are assembled symmetrically with respect to the centerline 61, adjacent one another on a square pivot shaft 94. Pivot ends 95 of the pawl levers 93 have square mounting apertures 96 which restrict rotational freedom of the levers 93 with respect to the shaft 94. Typical retainer clip rings 97 retain and support the levers 93 from moving outwardly away from the center of the shaft 94, while a compressed compression spring 98 urges the levers 93 against the respective retaining rings 97. Outer ends 101 opposite the pivot or mounting ends of the pawl levers 93 carry upward pointed prongs 102 or pointed hooks 102, which are intended to engage and retain the data collection terminal 11 when the hooked ends 101 are moved upward toward engagement of the data collection terminal 11.

The outer ends 101 or hooked ends 101 carrying the prongs 102 protrude through the docking seat molding 46 via two respective pawl openings 103. Advantageously, the pawl openings 103 and the respective protrusion of the prongs 102 are closer toward the insertion end 16 of the docking device 10 than the spring contact openings 80. Bearing ends 104 and 105 of the respective left and right latch release levers 59 and 60 have internal square openings 107 to slidingly engage the square pivot shaft 94 without rotational freedom, and have rotational bearing surfaces 109 which, upon assembly, become seated in complementary bearing apertures 110 of the docking seat molding 46. Two additional retainer clips 97 prevent the latch release levers 59 and 60 from moving inward on the pivot shaft 94 to remain in pivot bearing contact with the docking seat molding 46 and to permit the retention pawl assembly 89 to pivot in its entirety with respect to the docking seat molding 46. When the assembled docking seat molding 46 is inserted into the outer housing shell 30, two complementary leaf springs 114 of the leaf spring structure 91 engage the respective pawl levers 93 and resiliently urge the prongs 102 upward through the docking seat molding 46 into the path of an inserted data collection terminal 11. The leaf springs 114 have a desirable spring constant and a pretension when fully extended to urge the prongs 102 into a retaining recess of the data collection terminal 11, but also, to urge the data collection terminal 11 in a direction toward and against the retaining ledges or caps 63 and 64 of the docking seat molding 46, such that any clearances between the insertion space of the terminal receiving cavity 13 and the data collection terminal 11 is taken up toward the retaining ledges 63 and 64 and in a direction away from the spring contacts 79. The normal extent of the spring contacts 79 into the docking channel 49 is such that, in an uppermost position of the data collection terminal 11, the spring contacts 79 remain in forced contact with the complementary surface contacts 88. Thus, in a static, vibration free retention of the data collection terminal 11 within the terminal receiving cavity 13, the contact force between the spring contacts 79 and the complementary surface contacts 88 of the data collection terminal 11 will be an optimally minimum forced contact between the respective sets of contacts 79 and 88. Any vibration or shock which may cause movement of the data collection terminal 11 will tend to increase the contact force between the respective contacts 79 and 88.

The seat base molding 48 is inserted from the retention end 18 into the outer housing shell 30. Two coil springs 116 are fitted into spring retaining guide columns 117 of the seat base molding 48. The guide columns 117, in turn, slidingly fit into complementary guide recesses 118 of the docking seat molding 46. When the docking seat base plate 56 is assembled to the retention end 18 of the docking device 10, the coil springs 116 become compressed and the seat base molding 48 is urged in a direction toward the insertion end 16 until stopped by molded ledges 119 of the docking seat molding 46. The spring constant of the coil springs 116, their lengths, and the total compression force when assembled in this manner is desirably chosen to be in excess of the total weight of a data collection terminal 11 inserted into the docking device 10.

FIG. 6 shows a side view of the data collection terminal 11, showing, adjacent a lower end 120 thereof, a surface contact assembly 121. The surface contact assembly 121 has several functions. Firstly, the surface contacts 88 of the data collection terminal 11 are molded into the assembly 121. Secondly, the assembly 121, when mounted to the lower end 120 of the data collection terminal 11, also retains one end of the handstrap 68 that stretchedly extends longitudinally along the underside of the data collection terminal 11. The surface contact assembly 121 extends also away from the sloped underside of the lower end of the data collection terminal 11. An upper ledge 123 forms retaining ledges or seats 124 which are positioned to become engaged by the prongs 102 (see FIG. 5) to positively retain the data collection terminal 11, when inserted into the terminal receiving cavity 13 of the docking device 10.

The ledge 123 forms, with the sloping housing 12 at that end, the seats 124 which become engaged by the prongs 102 at substantially right angles to the longitudinal insertion direction of the data collection terminal 11 within the cavity 13. When the spring bias on the prongs 102 urge the data collection terminal 11 toward the retaining ledges 63 and 64, the data collection terminal 11 becomes latched into position with a positive lock. Any resiliency in the pawl levers 93 is at right angles to a removal force, and any movement of the data collection terminal 11 away from the upper retaining ledges 63 and 64 only increase the force with which the pawl levers 93 engage the seats in the ledge 123.

FIG. 7 shows a clearly defined width "W" of the surface contact assembly 121. The surface contact assembly 121 also extends away from the housing 12 across its width "W", projecting at the lower end 120 of the data collection terminal 11 away from the generally smooth contour of the housing 12. Outer surfaces across the width "W" of the projection, that is to say, across the width of the surface contact assembly 121 are ideally chosen as reference edges. The reference edges establish a precise transverse position of the surface contacts 88 with respect to the docking device 10 when the surface contact assembly 121 is guided along the complementarily spaced lateral guide surfaces 78 of the docking seat molding 46. The final alignment prior to latching centrally aligns the data collection terminal 11 with respect to the docking device 10. Even with minor tolerance differences in the assembly of the surface contact assembly 121 to the housing 12 of the data collection terminal 11, the surface contacts 88 are always precisely aligned with the complementary spring contacts 79. To assure repeatability of such alignment, the opposing ledges or guiding surfaces 78 of the docking seat molding 46 are spaced to slidingly accept the surface contact assembly 121 with a minimum of acceptable clearance over the width "W" of the assembly 121. The lower guide pins 76 have a spherical top 77, hence, equal rounding in all directions, so as not to interfere with lateral repositioning of the data collection terminal 11 during final alignment of the respective surface contacts 88 with respect to the spring contacts 79 in the docking seat molding 46.

FIG. 8 is a partially broken side elevation of the docking device 10, and particularly of the retention end 18 of the docking device 10. The retention pawl mechanism 90 including the leaf springs 114 and the latch release levers 59 and 60 are shown in a primary engaged position, with the data collection terminal 11 being in a fully inserted position. In this fully inserted position, the coil springs 116 are compressed and the seat base molding 48 exerts an urging force against the lower end 120 of the data collection terminal 11. The latch release levers 59 and 60 are both directly coupled through the pivot shaft 94 to the pawl levers 93. When either of the latch release levers 59 or 60 is depressed downward in a direction of arrow 125, the pawl levers 93 pivot in unison with the pivot shaft 94 and the prongs 102 are moved into an alternate, disengaged position as shown for illustrative purposes only. At the moment of movement to the disengaged position, the data collection terminal 11 would become released from the latched or positively locked retention position. The seat base molding 48 would urge the data collection terminal 11 toward the insertion end of the docking device 10. Allowing the release lever, either 59 or 60, to return to its normal position after a mere momentary depression no longer accomplishes a return of the prongs 102 to their prior position against the seats 124 in the ledge 123 of the surface contact assembly 121. The data collection terminal 11 has moved from its fully inserted position at least to a position in which the data collection terminal 11 rests against the seat base molding 48, and the seat base molding 48 has been urged by the coil springs 116 against the molded ledges 119, the at least partially removed position of the data collection terminal 11 being shown in FIG. 15. The retention pawl mechanism 90 accomplishes, as described, an automatic latching of the data collection terminal 11 into the docking device 10 when the data collection terminal 11 is fully inserted against the spring bias exerted by the seat base molding 48. It should be apparent that this is readily accomplished by an operator with a single-handed movement, no other manual locking operation being necessary. When it is desired to remove the data collection terminal 11 from the docking device 10, again a single-handed operation is all that is required to release the data collection terminal 11. By depressing either of the release levers 59 or 60, the data collection terminal 11 is released, but remains loosely retained in the docking channel 49 to be removed by an operator at will. The retention pawl mechanism 90 accomplishes thereby a desired single-handed latch and release function of the docking device 10, including a selectively implemented non-latched, temporary holding function for a data collection terminal 11.

FIG. 9 shows an exploded view of parts of the retention pawl assembly 89. The retainer clips 97 are insertible into typical grooves 126 which then retain the pawl levers 93 on the square pivot shaft 94 with the spring 98 disposed there between. FIG. 10 shows the assembled retention pawl mechanism 90 in the end view of the retention end 18 of the docking device 10. The latch release levers 59 and 60 are assembled onto the pivot shaft 94 and are with their circular bearing surfaces 109 disposed within the corresponding molded bearing bores 110 of the docking seat molding 46. The seat base molding 48 is guided by the docking seat molding 46 and is retained within the outer housing shell 30, and particularly by the caps 32 and 33 thereof. In FIG. 11, a placement of the retainer clip 97 on the shaft 94 and against the pawl lever 93 is depicted, showing a circular machined neck of the groove 126 in the pivot shaft 94.

FIG. 12 is an enlarged side view, broken to illustrate a mounting of the spring contact assembly 85 to an underside of the docking seat molding 46. The spring contacts 79 extend through respective openings 80 through the docking seat molding 46 into contact with the respective surface contacts 88 on the surface contact assembly 121. Because of the urging force of the prong 102 against the lower end of the data collection terminal 11, a gap 130 may exist between the crowned end 77 of the guide pins 76 and an underside 131 of the data collection terminal 11. Thus, when fully inserted and in a latched position within the docking device 10, the data collection terminal 11 would typically be biased, at least at the retention end 18 of the docking device 10, against the retaining ledges 63 and 64. In such upward-biased position, the spring contacts 79 exert a minimum, yet optimum, contact force against the respective, mating surface contacts 88 on the data collection terminal 11. Any vibration of the data collection terminal 11 within the retention cavity 13 with vibratory movement toward the guide pins 76 tends to increase the contact force between the spring contacts 79 and the surface contacts 88. Also, the mass of the spring contacts 79 is much less than the mass of the data collection terminal 11, such that in a vibratory environment of the docking device 10, the spring contacts 79 tend to keep up with any vibratory movement of the data collection terminal 11 between the ledges 63, 64 and the guide pins 76, thereby virtually eliminating any risk of contact bounce between the spring contacts 79 and the surface contacts 88 on the data collection terminal 11. Any risk of contact bounce between the respective contacts would be highly detrimental to a contemplated function of the docking device 10 of transferring data between the data collection terminal 11 and other data devices (not shown but represented by the docking device 10) which may be coupled directly or indirectly to the docking device 10. Thus, once a data collection terminal 11 has been inserted and locked into the docking device 10, batteries of the data collection terminal 11 may be recharged and, simultaneously therewith, data may be up-loaded or down-loaded between another data device represented by the docking device 10, and the data collection terminal 11. An outer end 132 of the spring contacts 79 normally rests against the underside of the docking seat molding 46, the outer end 132 serving as a stop to excessive movement of the spring contacts 79 into the retention cavity 13. The outer ends or stops 132 therefore allow the spring contacts 79 to have an initial spring bias force designed into the spring contacts 79 to maintain a minimum contact force between the spring contacts 79 and the surface contacts 88. An angular orientation of the surface contacts 88 with respect to the longitudinal extent of the data collection terminal 11 tends to cam the spring contacts 79 slopingly against the surface contacts 88 as the data collection terminal 11 is inserted and latched into the docking device 10. The sloped orientation of the surface contacts 88 and the resulting camming action during the insertion of the data collection terminal 11 advantageously provides for contact wiping action during each terminal insertion operation. The sloped orientation of the surface contacts 88 may also provide limited contact wiping action during vibrational movement of the data collection terminal 11 within the docking device 10.

An enlarged view of the spring contact assembly 85 is shown in FIG. 13. The spring contacts are preferably molded into, but may be otherwise attached to, the mounting bracket 84. A third mounting hole 133, which is offset from the mounting holes 87, provides torsional stability to resist the spring force exerted to the bracket 84 when the spring contacts 79 engage the surface contacts 88 of the data collection terminal 11.

Figure 14:
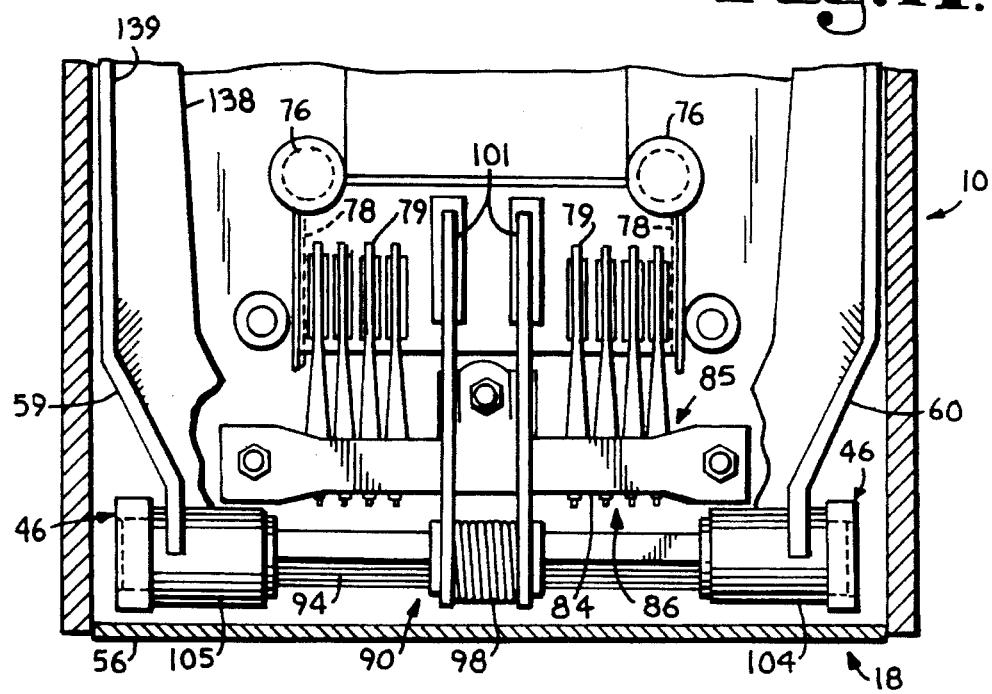
FIG. 14 is a sectional bottom view of the retention end of the docking device in FIG. 12.

FIG. 14 shows particular details of the preferred guiding arrangement for the data collection terminal 11 at the retention end 18 of the docking device 10. The lower guide pins 76 provide sliding support for a data collection terminal 11, while lateral edges 78, as opposing guide ledges 78 guide the data collection terminal 11 (see FIG. 3) into contact with the spring contacts 79.

Figure 15:
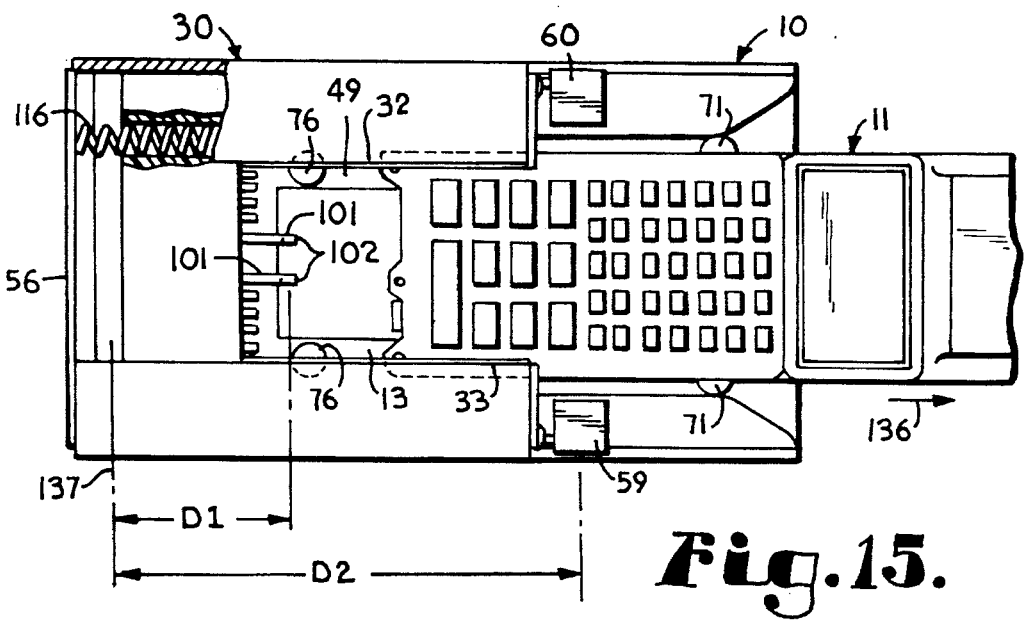
FIG. 15 is a partially sectioned top or plan view of the docking device showing a data collection terminal in a partly removed position and showing a spring biased seat biased in an upward or forward biased position closer toward an insertion end of the docking device.

FIG. 15 shows the data collection terminal 11 being removed in a direction toward the insertion end 16 of the docking device 10 as shown by arrow 136. The plan view also shows a mechanical advantage in the latch release levers 59 and 60 with respect to the force application by the prongs 102 against the data collection terminal 11 when the data collection terminal is fully inserted into the docking device 10. A first distance "D1" shows a distance from an axis 137 of the pivot shaft 94 to the prongs 102. A second distance "D2" is desirably significantly longer from the pivot axis 137 to where an operator would have access to the latch release levers 59 and 60. A depression force on either of the latch release levers 59 or 60, for releasing the pawl levers 93 from engagement with the data collection terminal 11, is a corresponding fraction of the force by which the prongs 102 force an inserted data collection terminal 11 upward against the retaining ledges 63 and 64 beneath the caps 32 and 33. The latch release levers 59 and 60 are preferably and desirably formed of a light molded plastic structure to minimize the weight and mass of the levers. Strength of the latch release levers 59 and 60 is obtained by an angular release lever structure. Accordingly, the release levers 59 and 60 are both formed or molded of respective horizontally and vertically disposed strip-like walls or beams, which are respectively designated by the numerals 138 and 139 on the release lever 59 shown in FIG. 14. The beams or walls 138 and 139 are merged along a common corner into a unitary structure of angular cross section. The release lever structure of the release lever 60 is preferably a mirror image of that of the release lever 59, also having horizontal and vertical beams which merge along one edge into a joint angular structure or structure of angular cross section, as shown in the drawings. Other ways of minimizing the weight versus strength of the release levers may be implemented in view of the teaching herein, in view of a disclosed recognition of a need to minimize the mass of the release levers. A mass or weight minimization is desirable to avoid accidental releases of the data collection terminal 11 under severe shock conditions.

Various other changes and modifications in the use and implementation of the described embodiments are possible without departing from the spirit and scope of the invention as set forth in the claims.

What is claimed is:

1. An end-insertion docking device for a data collection terminal comprising:

a docking channel having an insertion opening at an insertion end thereof and having a retention end opposite the insertion end, the docking channel having a base wall and having terminal retention surface caps disposed spacedly opposite the base wall, forming a retention cavity therebetween;

an electrical spring contact assembly disposed at the retention end, the electrical spring contact assembly having spring contacts extending through the base wall of the docking channel into the retention cavity to move into electrical contact with surface contacts on a data collection terminal; and means for engaging an inserted data collection terminal when fully inserted into the retention cavity, the engaging means having means for positively latching an inserted data collection terminal into the fully inserted position and for urging an inserted and latched data collection terminal in a direction away from the spring contacts and against the retention surface caps, whereby any movement due to shock or vibration moves an inserted data collection terminal toward engagement with the spring contact to thereby eliminate contact opening between the spring contacts and surface contacts on an inserted data collection terminal.

2. An end-insertion docking device for a data collection terminal comprising:

a docking channel means including a longitudinally extending docking channel having an insertion end and a retention end longitudinally opposite the insertion end, the docking channel having a base wall, side walls and inwardly extending retention caps opposite the base wall;

spring contact means disposed adjacent the retention end and having spring contacts, the spring contacts resiliently biased to extend into the docking channel to resiliently engage surface contacts of a data collection terminal upon insertion of the data collection terminal into the docking channel; and retention means for selectively latching a data collection terminal in a retained position upon insertion of the data collection terminal into the docking channel, the retention means including means for resiliently urging a selectively latched data collection terminal away from the base wall and in a direction away from the spring contacts into engagement with the retention caps, such that the spring contacts contact the surface contacts of the inserted data collection terminal with a minimum contact force when the data collection terminal is urged against the retention caps, whereby the contact force between the spring contacts and the surface contacts of the inserted data collection terminal increases when the data collection terminal is urged out of engagement with the retention caps.

3. The end-insertion docking device according to claim 2, comprising a plurality of guide pins mounted in and protruding from the base wall into the docking channel, the guide pins having guide ends spaced from the base wall of the docking channel, thereby spacing a data collection terminal inserted into the docking channel from the base wall.

4. The end-insertion docking device according to claim 3, wherein the plurality of guide pins comprises a first pair of upper guide pins disposed adjacent the insertion end and a second pair of lower guide pins disposed adjacent the retention end of the docking channel.

5. The end-insertion docking device according to claim 4, wherein the first pair of upper guide pins is transversely spaced within the docking channel, and the upper guide pins have upper guide surfaces with an inward slope toward the docking channel and a cylindrical crown formed about an axis in the direction of the slope, the upper guide pins being spaced to engage lower longitudinal corners of a housing of an inserted data collection terminal, and wherein the second pair of lower guide pins are transversely spaced within the docking channel, and the lower guide pins have cylindrically crowned upper guide surfaces, the lower guide pins being spaced to guide a lower surface of housing of an inserted data collection terminal adjacent longitudinal corners thereof.

6. An end-insertion docking device for a data collection terminal comprising:

a docking channel having a longitudinal extent and an insertion end with an insertion opening at the insertion end, a retention end longitudinally opposite from the insertion end, the docking channel having a base wall and having terminal retention surface caps disposed spacedly opposite the base wall, forming a retention cavity therebetween;

a plurality of guide pins mounted in and protruding from the base wall into the docking channel, the guide pins having guide ends spaced from the base wall of the docking channel, thereby spacing a data collection terminal inserted into the docking channel from the base wall; and means for selectively latching a data collection terminal into, and releasing a latched data collection terminal from, the docking device; said means for selectively latching and releasing comprising:

(a) at least one retention pawl lever pivotally mounted to pivot about a pivot shaft and urged with a bias force to protrude into the docking channel adjacent the retention end of the docking device to lockingly engage the data collection terminal when fully inserted into the docking channel; and (b) at least one release lever extending in the longitudinal direction of docking channel and pivotably coupled to the pivot shaft, the at least one release lever being pivotably movable to move the at least one retention pawl lever against the urging of the bias force away from protruding into the docking channel, the at least one release lever having a pivot length which exceeds a pivot length of the retention pawl lever about the pivot shaft to provide a mechanical advantage for a second force less than the bias force to move the release lever against the bias force.

7. The end-insertion docking device according to claim 6, wherein the at least one retention pawl lever comprises two retention pawl levers symmetrically spaced with respect to a longitudinal centerline through the docking channel.

8. The end-insertion docking device according to claim 6, wherein the at least one release lever comprises two release levers symmetrically spaced with respect to a longitudinal centerline through the docking channel.

9. The end-insertion docking device according to claim 6, wherein the release lever has an angular structure comprising a horizontal beam and a horizontal beam merged at a joint corner into a joint structure of angular cross section.

10. An end-insertion docking device for a data collection terminal comprising:

a docking channel having a longitudinal extent and an insertion end with an insertion opening at the insertion end, a retention end longitudinally opposite from the insertion end, the docking channel having a base wall and having terminal retention surface caps disposed spacedly opposite the base wall, forming a retention cavity therebetween;

a plurality of guide pins mounted in and protruding from the base wall into the docking channel, the guide pins having guide ends spaced from the base wall of the docking channel, thereby spacing a data collection terminal inserted into the docking channel from the base wall; said plurality of guide pins comprising a first pair of upper guide pins transversely spaced within the docking channel adjacent the insertion end, the upper guide pins having upper guide surfaces having an inward slope toward the docking channel and a cylindrical crown formed about an axis in the direction of the slope, the upper guide pins being spaced to engage lower longitudinal corners of a housing of an inserted data collection terminal, and a second pair of lower guide pins transversely spaced within the docking channel adjacent the retention end, the lower guide pins having cylindrically crowned upper guide surfaces, the lower guide pins being spaced to guide a lower surface of housing of an inserted data collection terminal adjacent longitudinal corners thereof; and means for selectively latching a data collection terminal into, and releasing a latched data collection terminal from, the docking device.

11. An end-insertion docking device for a data collection terminal comprising:

a docking channel having a longitudinal extent and an insertion end with an insertion opening at the insertion end, a retention end longitudinally opposite from the insertion end, the docking channel having a base wall and having terminal retention surface caps disposed spacedly opposite the base wall, forming a retention cavity therebetween;

a plurality of guide pins mounted in and protruding from the base wall into the docking channel, the guide pins having guide ends spaced from the base wall of the docking channel, thereby spacing a data collection terminal inserted into the docking channel from the base wall; and means for selectively latching a data collection terminal into, and releasing a latched data collection terminal from, the docking device; said means for selectively latching and releasing comprising a pair of retention pawl levers transversely spaced about a longitudinal centerline through the docking channel, the retention pawl levers being pivotably mounted and having movable outer ends and each such end terminating in a retention prong, the retention pawl lever being pivotably biased with the retention prongs yieldingly protruding into the docking channel adjacent the retention end, the retention prongs yieldingly engaging an inserted data collection terminal to retain such inserted data collection terminal in a fully inserted position.

12. The end-insertion docking device according to claim 11, wherein the plurality of guide pins comprises a first pair of upper guide pins disposed adjacent the insertion end and a second pair of lower guide pins disposed adjacent the retention end of the docking channel.

13. An end-insertion docking device for a data collection terminal comprising:

a docking channel having a longitudinal extent, an insertion end with an insertion opening and a retention end spaced longitudinally opposite from the insertion end; the docking channel having a base wall and terminal retention surface caps spaced opposite the base wall such that a retention cavity is formed therebetween;

a plurality of spring contacts, protruding into the docking channel, and guide surfaces forming part of the docking channel such that a plurality of surface contacts of the data collection terminal are guidable into alignment with the spring contacts; and means for selectively and one-handedly engaging the data collection terminal into, and one-handedly removing the data collection terminal from, the docking device; and wherein the terminal retention surface caps engage oppositely and peripherally disposed portions of the data collection terminal such that a keyboard of the data collection terminal inserted into the docking device remains accessible.

* * * * *